Aug. 6, 1946.   J. F. WATERFIELD   2,405,337
GEAR CUTTING
Filed April 7, 1943   6 Sheets-Sheet 1
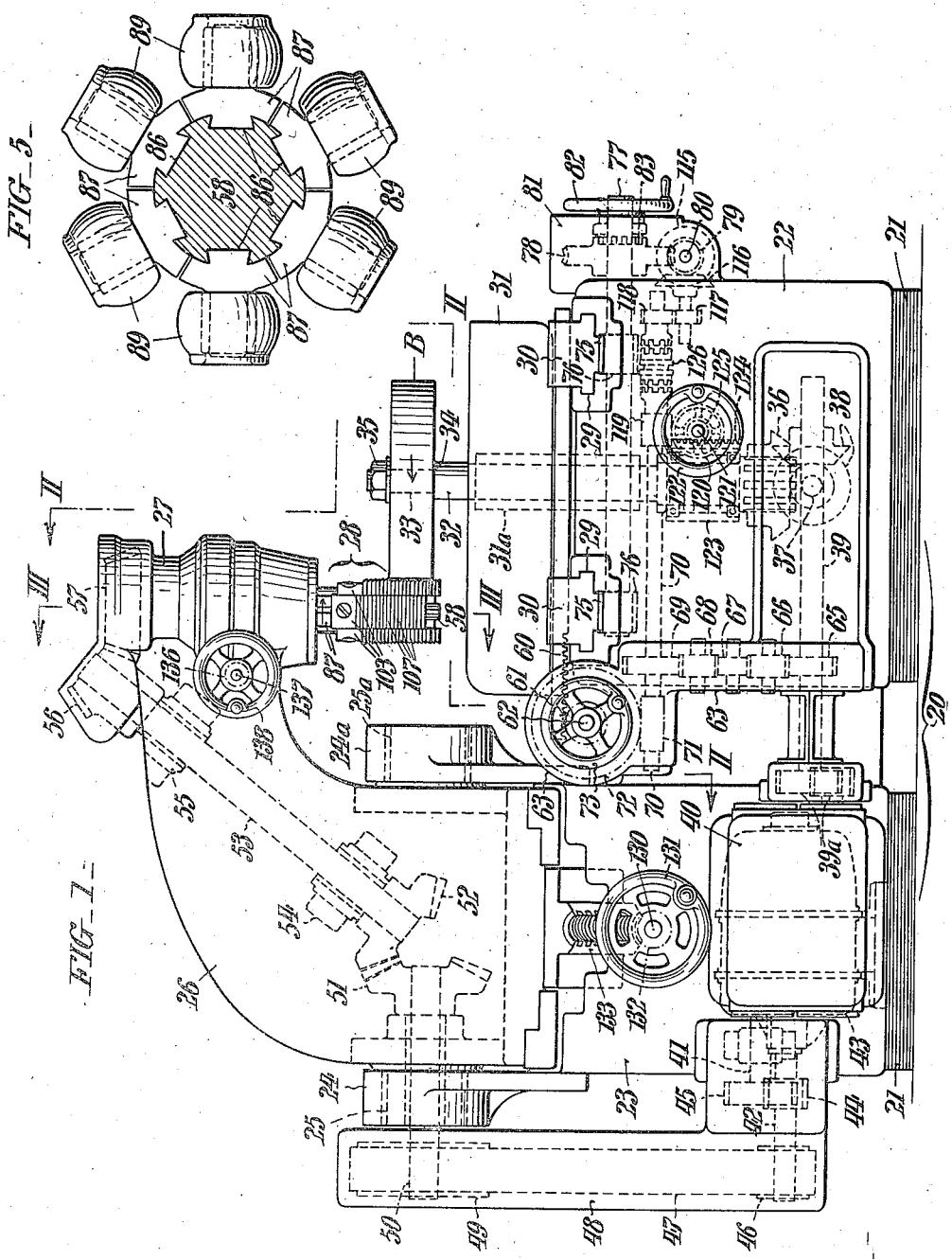
INVENTOR:
John Fox Waterfield,
BY
ATTORNEYS.

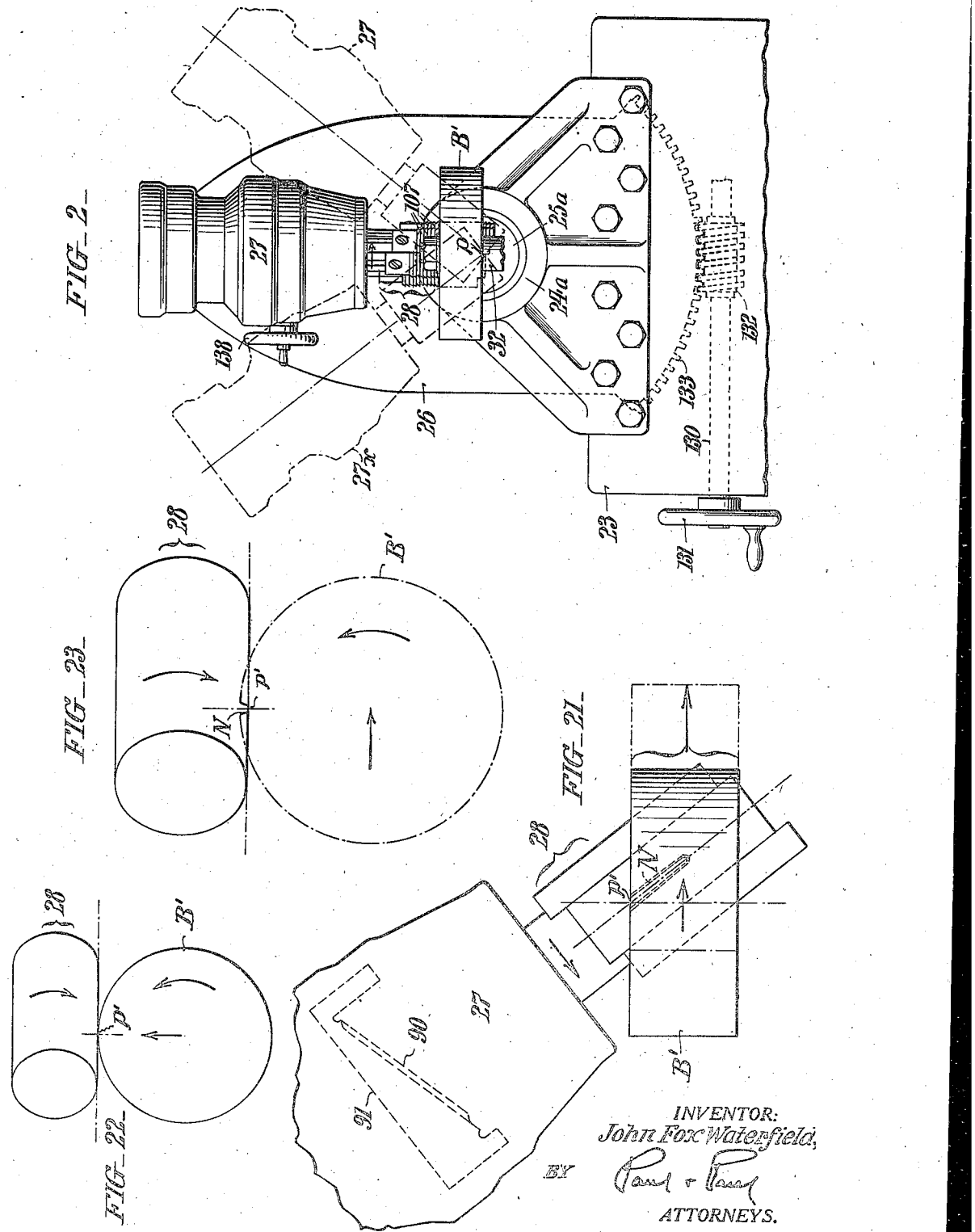

Aug. 6, 1946. J. F. WATERFIELD 2,405,337
GEAR CUTTING
Filed April 7, 1943 6 Sheets-Sheet 3
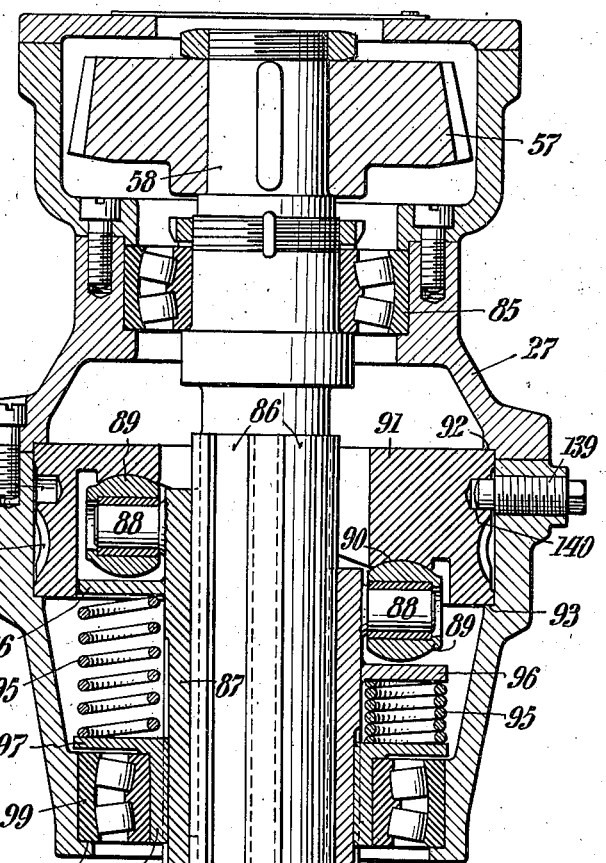
FIG_3_
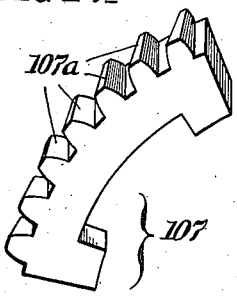
FIG_7_
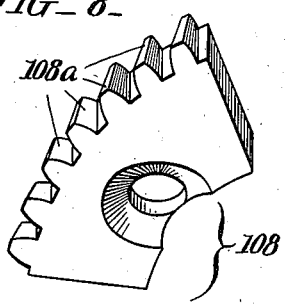
FIG_8_
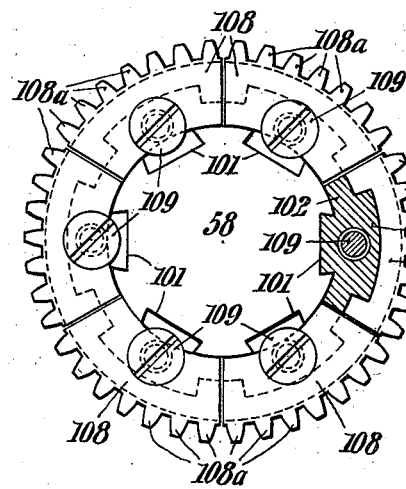
FIG_6_
INVENTOR:
John Fox Waterfield,
BY
ATTORNEYS.

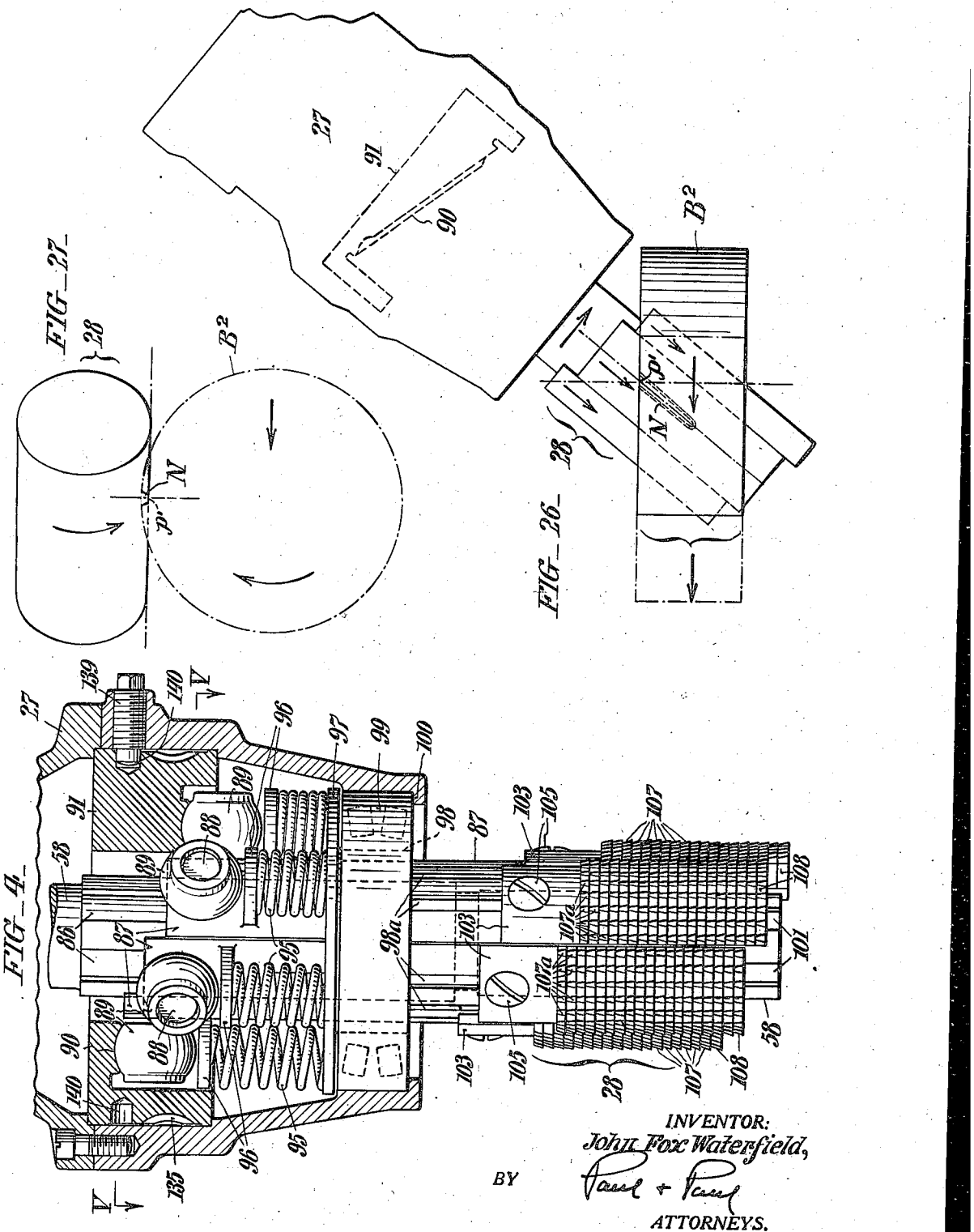

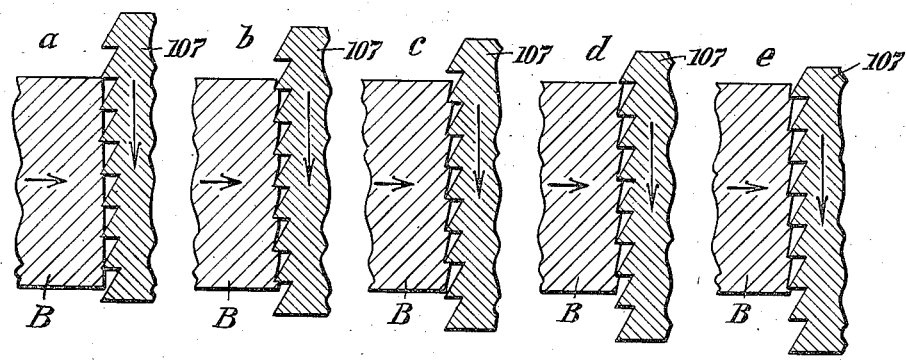
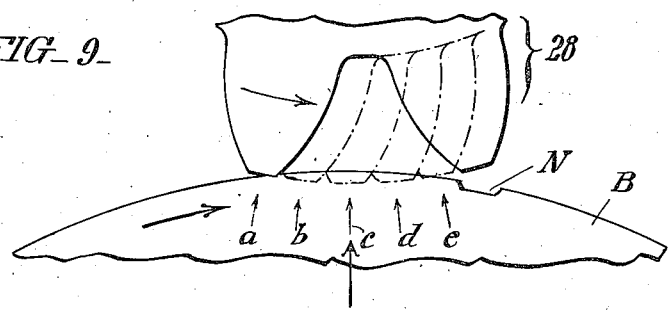
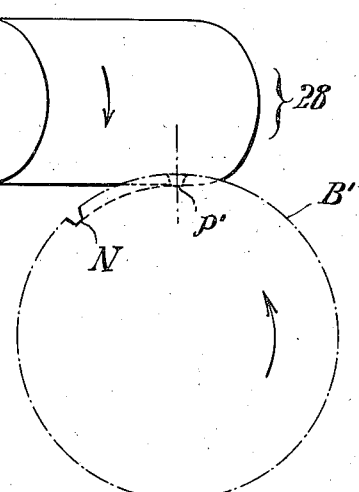
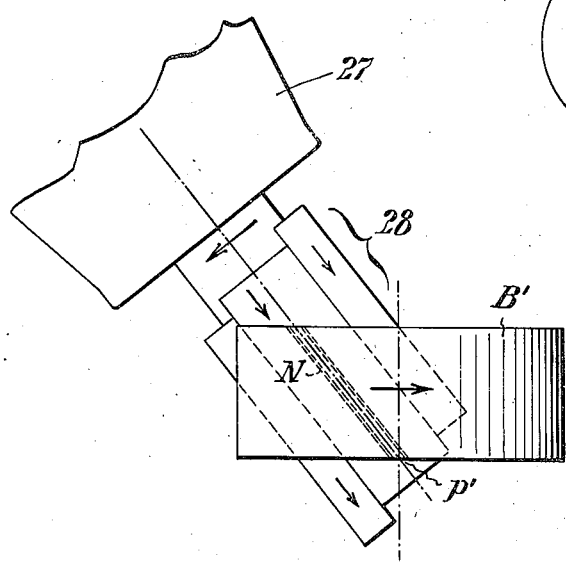

FIG_15_
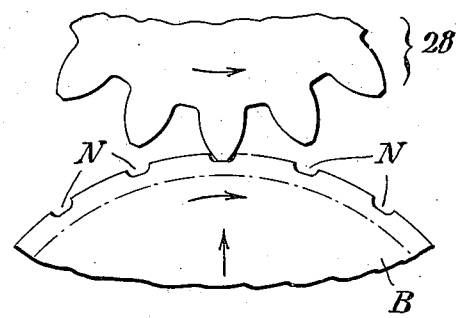
FIG_16_
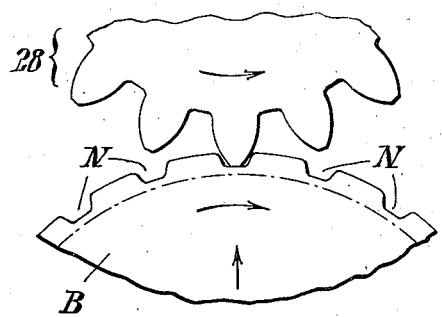
FIG_17_
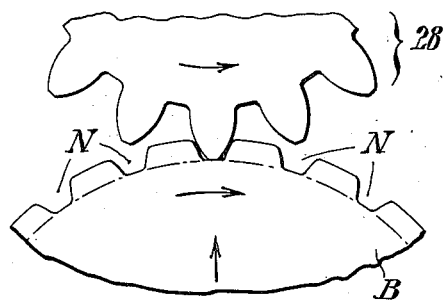
FIG_18_
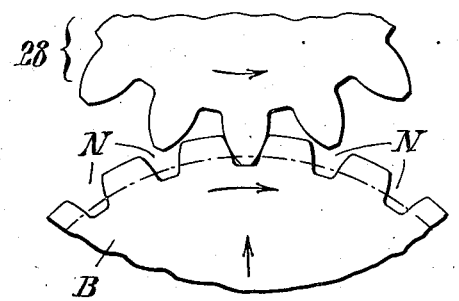
FIG_19_
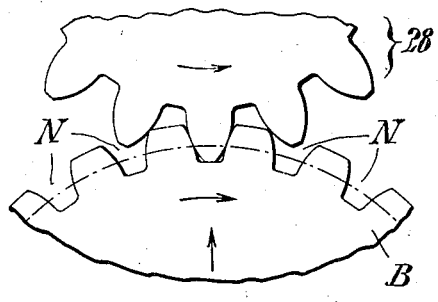
FIG_20_
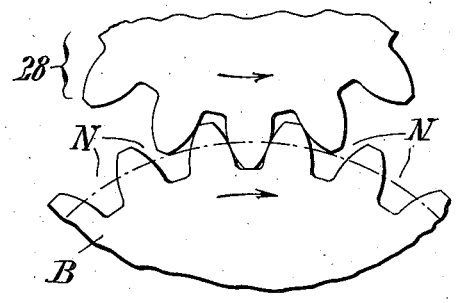
INVENTOR:
John Fox Waterfield,
BY
ATTORNEYS.

Patented Aug. 6, 1946

2,405,337

UNITED STATES PATENT OFFICE 2,405,337

GEAR CUTTING

John F. Waterfield, Philadelphia, Pa.

Application April 7, 1943, Serial No. 482,089

10 Claims. (Cl. 90—7)

1

This invention relates to gear cutting, and is concerned with both gear cutting machines and with improved gear cutting methods.

In prior art gear cutting machines such as exemplified in U. S. Patent No. 1,998,835 granted to E. R. Fellows on April 23, 1935, the gear blank must be withdrawn from contact with the cutter head after each partial cut is made in the face of the blank. This action is continuously repeated not only during each rotary phase of the blank and cutter head but throughout the period of the cutting until the blank is completely transformed into a gear. Gear cutting under the above principle is necessarily slow and costly due to the loss of time occasioned by the repeated retraction of the blank from engagement with the cutter head between cuts.

My invention has for its chief aim to overcome this drawback, which desideratum is realized in practice as hereinafter more fully disclosed, through provision of a machine having a cutter head which revolves continuously and synchronously with the gear wheel blank while in constant peripheral contact therewith, and which has a plurality of circumferentially arranged slides with lengthwise serrated cutter projections of gear tooth cross sectional configuration, the total number of projections being commensurate with that of the notches to be cut in the blank. During the operation of the machine, the slides are reciprocated for movement of the cutter projections across the face of the blank during the periods of individual contact therewith, and the blank gradually moved toward the cutter head until the desired depth of cut is obtained all around said blank.

In connection with a gear cutting machine having the foregoing attributes it is a further aim of my invention to enable cutting not only of spur gears, but of either left-hand or right-hand helical gears as well, and this objective is secured, as also hereinafter more fully set forth, through provision of means whereby the cutter head can be angularly adjusted to opposite sides relative to the axis of the gear wheel blank for diagonal contact with the peripheral face of the latter.

Other objects and attendant advantages will appear from the following description of the attached drawings, wherein Fig. 1 is a view in side elevation of an automatic gear cutting machine conveniently embodying the present improvements and suitable for the carrying out of my novel method.

Fig. 2 is a fragmentary view in elevation as

2 observed from the staggered plane of the arrowed line II—II in Fig. 1.

Fig. 3 is an axial section through the cutter head of the machine taken as indicated by the angled arrows III—III in Fig. 1.

Fig. 4 is a fragmentary view generally similar to Fig. 3 with the cutter slides and the actuating means therefor in elevation.

Fig. 5 is a cross section of the cutter head spindle taken as indicated by the angled arrows V—V in Fig. 4.

Fig. 6 shows the bottom end view of the cutter head with a portion broken away and with one of the cutter slides in transverse section, the view being taken as indicated by the angled arrow VI—VI in Fig. 3.

Figs. 7 and 8 are perspective views of two different types of cutter elements or laminations employed in the machine.

Fig. 9 is a fragmentary view in plan showing how the notches are progressively cut into the gear blank by the cutter projections of the cutter head.

Figs. 10-14 are diagrammatic views in section showing how the cutting is progressively accomplished.

Figs. 15-20 are views generally similar to Fig. 9 showing successive advanced stages in the cutting operation.

Fig. 21 is a fragmentary view corresponding to Fig. 2 on a larger scale showing how right-hand helical gears are cut in the machine.

Figs. 22-25 are diagrammatic views showing successive stages in the cutting of right-hand helical gears.

Fig. 26 is a view generally like Fig. 21, and

Fig. 27 is a view similar to Fig. 23 showing how left-hand helical gears are cut in accordance with my invention.

With reference first more particularly to Fig. 1 of these illustrations, my improved gear cutting machine has a frame 20 with a base 21 from one end of which rises a pedestal 22, and from the other end a standard 23. Pivotally supported in bearings 24 and 24a afforded by the standard 23 are the horizontal axis trunnions 25 and 25a of an arm 26 which overhangs the pedestal 22 and which terminates in a housing 27 for a cutter head comprehensively designated by the numeral 28. At the top, the pedestal 22 has a pair of laterally-spaced transverse rabbeted slots 29 for slide bars 30 which support a carriage 31 with capacity for being horizontally shifted longitudinally of the machine. Journaled in a bearing 31a on the carriage 31 is a vertical arbor 32 whereof the upper protruding end is diametrically reduced as at 33 with provision of a shoulder 34 to support a gear wheel blank B, said blank being securable by a clamp nut 35. Splined to the lower end of the arbor 32 is a bevel gear 36 that meshes with a similar gear (not illustrated) slidably splined on a transverse shaft 37. Through a bevel gear couple 38, the shaft 37 is connected to a horizontal shaft 39 which is driven, through spur gears 39a from a change gear unit 40, whereof the input shaft 41 is in turn driven from the shaft 42 of an electric motor 43 through a pair of intermeshing spur gears 44 and 45. As shown, the horizontal shaft 42 carries a sprocket wheel 46 which through a silent chain 47 which extends upward through a protecting housing 48, communicates rotary motion to a sprocket wheel 49 at the outer end of a shaft 50 journaled axially within the trunnion 25 of the arm 26. A bevel gear 51 at the inner end of the shaft 50 mates with a companion bevel gear 52 on an inclined shaft 53 journaled in bearings 54 and 55 on the bracket 26. Through a pair of intermeshing bevel gears 56 and 57 the shaft 53 transmits motion to the spindle 58 of the cutter head 28. Affixed to the bottom of the carriage 31 is a toothed rack 60 which meshes with a spur pinion 61 on a transverse shaft 62 journaled in the top of a protective casing 63 on the pedestal 22. Within the casing 63 is a train of spur gears 65, 66, 67, 68 and 69 whereby rotary motion is transmitted from the shaft 39 to a horizontal shaft 70 with a worm 71 thereon in mesh with a worm wheel 72 fast with the spur pinion 61 to the transverse shaft 62. By means of a suitable clutch (not illustrated) the worm wheel 72 may be disconnected from the shaft 62 so that the latter can be turned by means of a hand wheel 73 when it is necessary to shift the carriage 31 manually at right angles to the slide bars 30 and toward the cutter head. Rack teeth 75 at the bottoms of the slide bars 30 mesh with spur pinions 76 on a horizontal actuating shaft 77 which is journaled in the pedestal 22. The shaft 77 carries a worm wheel 78 which engages a worm 79 on a crosswise shaft 80 journaled in a housing 81 on the pedestal. Slidably splined to the protruding end of the shaft 77 is a hand wheel 82 having clutch teeth at 83 to engage corresponding clutch teeth in the adjacent hub face of the worm wheel 78 which is freely mounted on said shaft. Upon withdrawal of the hand wheel 82 from the worm wheel 78 by an extent sufficient to disconnect the clutch teeth, the shaft 77 can be manually turned when required. In power operation, the shaft 77 receives motion through the bevel and spur gear couples indicated at 115, 116 and 117, 118 respectively from the shaft 70 whereon is mounted a second worm 119 that meshes with a worm wheel 120 on still another transverse shaft 121 having a hand wheel 122. Surrounding the arbor 32 directly above the bevel gear wheel 36 is a ball bearing lift sleeve 123, which, at one side, has rack teeth 124 engaged by a spur pinion 125 on the shaft 121. As shown, a sliding clutch collar 126 makes possible selective coupling of the pinion 118 or the worm 119 to the shaft 70. A manually operable clutch (not illustrated) is also provided in practice whereby the worm wheel 120 can be disconnected from the shaft 121.

Referring now to Fig. 3, the spindle 58 of the cutter head 28 is journaled adjacent its upper end in a self-aligning roller bearing 85 within the housing 27, and the intermediate portion thereof below said bearing is longitudinally slotted as at 86 at uniform circumferential intervals, the slots (of which there are six in the present instance) being of dovetail cross sectional configuration for individual retainment and guidance of slides 87. At their upper ends, the slides 87 have lateral studs 88 for ball rollers 89 which contact an annular cam ledge 90 at the bottom of a circular plate 91 concentric with the cutter head axis and confined between internal circumferential shoulders 92 and 93 within the housing 27. The rollers 89 are held to the cam 90 by helical springs 95 in compression between lateral projections 96 on the individual slides 87 and the peripheral flange 97 of a collar 98 which surrounds the slides, and which has longitudinal tongue and groove engagement with said slides as at 98a. In turn surrounding the collar 98 is the inner race annulus of another self-aligning roller bearing 99 for the spindle 58, the outer race annulus of said bearing resting on an internal annular shoulder 100 at the bottom of the housing. The lower end portion of the spindle 58, is somewhat reduced in diameter and formed with longitudinal dovetail slots 101 in line with the slots 86 of the intermediate portion, for the guidance of extension pieces 102 whereof the upper ends are laterally offset as at 103 and overlap the lower ends of the slides 87 for attachment to the latter by screws 105. On the outer side of each extension piece 102 is a central longitudinal ridge 106 of dovetail cross sectional configuration which is engaged by a plurality of segmental cutter plates 107 (of which one is separately illustrated in Fig. 7) placed one above another. At the bottom of each group of cutter plates 107 is a segmental keeper plate 108, (of which one is separately illustrated in Fig. 8), which is secured to the lower end of the corresponding extension piece 102 by screws 109, and which serves to hold said plates 107 in place with the uppermost one of the latter bearing against the shoulder 103 on said extension piece. The cutter segments 107 and 108 are formed with plural edge projections 107a and 108a which have a gear tooth contour and which in the assembled cutter head are uniformly spaced circumferentially. As shown, the teeth 107a and 108a have their ends and sides outwardly and downwardly sloped to provide sharp cutting edges at their bottoms, and in each instance aggregate a number commensurate with that of the notches to be cut in the blank B.

For the cutting of plain spur gears, the cutter head 28 is set in the vertical position in which it is shown in Figs. 1 and 2, with its axis parallel to the arbor 32 which supports the gear blank B. For cutting helical gears the cutter head is inclined in one direction or the other as shown in broken lines in Fig. 2 and in full lines in Figs. 21 and 26, depending upon whether said gears are to be right or left-hand. It is for this purpose that the arm 26 (Fig. 1) is mounted for movement about the axis of its trunnions 25, 25a the means for effecting the different settings including a transverse shaft 130 which is journaled centrally of the standard 23. As shown, the shaft 130 is provided with a hand wheel 131 and carries a worm 132 in mesh with a worm gear segment 133 at the bottom of the upright portion of the arm 26. In order to make possible the cutting of left and right-hand helical gears it is necessary, for a reason which will become obvious from later explanation herein, that the cam plate 91 in the housing 27 of the cutter head spindle 58 be rotatably shiftable to the extent of a half cycle.

The cam disk 91 is accordingly formed with peripheral teeth 135 which are engaged by a worm 136 on a transverse shaft 137 in the housing 27, said shaft being also provided with an actuating hand wheel 138. By means of the set screw shown at 139 in Fig. 3 and selectively engageable with appropriately spaced socket holes 140 in the cam plate 91, the latter can be secured against accidental displacement in rotatively adjusted positions.

The operation of my improved machine in cutting a plain spur gear wheel is as follows: In preparation, the blank B is secured to the supporting arbor 32 by means of the nut 35, the bars 30 manually adjusted by means of the hand wheel 82 to bring the carrier arbor 32 axially into line with the cutter 28 longitudinally of the machine, the carriage 31 manually adjusted by means of the hand wheel 73 to bring the blank into peripheral contact with said cutter, and the change gear unit 40 indexed for rotation of said carrier arbor and the cutter spindle 58 at the proper relative speeds. With this accomplished, the worm wheel 72 is clutched to the shaft 62, the worm gear 120 to the shaft 121, and the worm 119 to the shaft 70, and the motor 43 set into operation to drive the machine. During the operation the blank B is very gradually moved inward toward the cutter head 28 by action of the pinion 61 upon the rack 60, which pinion, as hereinbefore explained, is driven through the worm couple 71, 72, the spur gear train 65—69 and the output shaft 39 from the change gear unit 40. At the same time the blank B and the cutter 28 are slowly revolved at the same peripheral speed but in opposite directions, the former by virtue of the coordination of the arbor 32, through the bevel gears 36—38 with the shaft 39, while the latter is rotated through the bevel gears 56, 57, inclined shaft 53, bevel gears 51, 52, shaft 50, chain 48, shaft 42 and spur gears 44 and 45, by the motor 43. Also at the same time, the arbor 32 is gradually but very slowly elevated through actuation of the rack 124 on the lifting sleeve 123 by the pinion 125 on the shaft 121 which is driven through the worm gear couple 119, 120 from the shaft 70. This upward movement of the arbor continues until the notches are cut to the full depth in the blank, the total amount of elevation corresponding to about twice the thickness of one of the toothed segments of the cutter head 28 or the pitch of the cutter serrations. During a rotation of the cutter head 28, each cutter moves downward but once while in contact with the gear blank under the influence of the cam 91 and cuts into the face of the blank, the sharp edges of the cutter projections progressively removing minute portions of the metal, in the manner exaggeratedly shown in successive stages in Figs. 9–14, where Figs. 10–14 correspond to different portions a—e of the cutter projection shown in Fig. 9. As a consequence of the downward movement of each cutter bar 102 as the blank B moves upwardly in contact with the cutter head 28, the rolling action between the blank and the cutter head, and the gradual shifting of the blank toward the cutter head, the cutting will obviously be progressive during each contact period. In this connection, it is to be noted that the period of contact of each cutter projection or tooth with the blank is short as compared to the period of rotation of the cutter head as a whole. Thus the active or effective extent of axial movement of each slide 87 under the influence of the cam 91 is small and actually in practice corresponds to slightly more than the thickness of one of the cutter segments or the pitch of the cutter tooth serrations as will be understood from Figs. 9–14. It is to be further noted that the upward movement of the cutter slides 87 under the influence of the respectively associated springs 95 occurs while the individual cutter segments are out of contact with the blank. The cutting action will continue in the manner described with the result that the notches N in the blank will become deeper and deeper during successive rotations as diagrammatically shown in Figs. 15–19 until the full depth of cut is attained as in Fig. 20. Through use of cutters with plural cutting edges as shown and moving them slightly more than the pitch between their serrations as the blank is concurrently elevated progressively, the cutting is rendered relatively easy, the whole operation being accomplished without imposition of excessive strain upon the mechanism of the machine by reason of the shallowness of the cutter actuating cam 91. Moreover, by employing serrated cutters operating through a short stroke, I insure notches N which are not only smooth surfaced, but parallel with the axis of the blank. While in spur gear cutting according to my invention it is not absolutely essential to elevate the blank during the cutting, I prefer to resort to this movement since it not only expedites the operation but insures smoother surfaces.

To arrange the machine for the formation of a right-hand helical gear, the cutter head 27 is swung to the left of the vertical on the trunnions 25, 25a of the supporting arm 26 to the position 27x in Fig. 2, or as shown in full lines in Fig. 21, the angle depending on the slope of the cut desired in the blank B; and the cam 90 placed in the position in which it is shown in the latter illustration. The carriage 31 is next adjusted to bring the axis of the blank B' into the vertical plane through the axis of the trunnions 25, 25a and the arbor 32 adjusted vertically to bring the bottom of the blank to the level of the trunnion axis, all as also shown in Fig. 2, with the result that the axis of the head 27 will pass through the tangent point p on the face of the blank at the side remote from the observer in Fig. 2. The carriage 31 is thereupon shifted laterally to the left until a projected plane through the axis of the blank B' in Figs. 21 and 22 intersects the axis of the cutter head 27 at a tangential point p' in the top of said blank. The relationship of the cutter 28 and the blank B' in plan is now as diagrammatically shown in Fig. 22 with contact occurring between them only at the point p' in the top corner edge of said blank. With the foregoing initial preparation, the motor 43 is started to set the machine into operation, when the cutting will take place in the same manner as described in connection with the cutting of a spur gear during which the blank B' is gradually moved toward the cutter head 28 until the notches are cut to the full depth as shown in Fig. 23 when the machine will be brought to a stop. Since the axis of the cutter head is now at an angle to the blank axis, the depth of cuts, while full at the top corner edge of the blank, will taper off to vanishing points in the face of said blank as instanced in dotted lines in Fig. 21. For the completion of the cutting to an even depth across the full face width of the blank, the latter is gradually moved bodily thereafter to the right in Fig. 21 to the final position shown in dot-and-dash lines and in full lines in Fig. 25, during a subsequent finishing stage or phase. Before restarting of the machine to accomplish this, the clutch 126 is shifted to the right in Fig. 1 to connect the pinion 118 to the shaft 70 for automatic operation of the bars 75 upon which the carriage 31 is mounted. The required rate of lateral shifting of the blank B' must of course bear a definite relation to the angle of the cuts, and the change gear unit 40 be properly arranged or set for the purpose. Upon restarting of the machine, the cutting proceeds as before, but with the point p' at each notch in effect moving downward along the line of the slope of such notch until the cuts reach full depth at the lower corner edge of the blank.

Except for the initial preparatory setting of the machine and reversing the motor 43, the operation in cutting a left-hand helical gear in accordance with my invention is the same as above described for a right-hand helical gear. Here, and as shown in Fig. 26, the cutter head 27 is angularly set to the right of the vertical and the cam 90 turned through a half circle to the position in which it is shown in the last mentioned illustration before the machine is started to make the initial cuts in the blank B². Fig. 27 is like Fig. 23 and shows the completion of the first stage in the cutting of a left-hand helical gear. During the final stage of cutting, the blank is gradually moved laterally to the left instead of to the right as was done for the right-hand gear.

Having thus described my invention, I claim:

1. A gear cutting machine comprising a rotating support for a gear wheel blank; a juxtapositioned cutter head with a plurality of circumferentially-arranged lengthwise-extending individually movable cutter elements of gear tooth cross sectional configuration and of a number commensurate with that of the notches to be cut in the blank and respectively having multiple spaced transversely extending cutting edges; means for continuously rotating the blank and the cutter head at the proper relative speeds and in opposite directions while in constant peripheral contact; means for concurrently moving the cutter elements across the face of the blank during the periods of individual contact therewith respectively a distance equal substantially to the spacing between adjacent cutting edges; and means for gradually moving the blank and the cutter head toward each other laterally as they rotate together until the required depth of cut is obtained.

2. A gear cutting machine comprising a rotating support for a gear wheel blank; a juxtapositioned cutter head with a plurality of circumferentially-arranged lengthwise-extending individually movable cutter elements of gear tooth cross sectional configuration, and of a number commensurate with that of the notches to be cut in the blank and respectively having multiple spaced transversely-extending cutting edges; means for continuously rotating the blank and the cutter head at the proper relative speeds and in opposite directions while in constant peripheral contact; means for concurrently moving the cutter elements crosswise of the blank face in one direction only during the periods of individual contact therewith respectively a distance equal substantially to the spacing between adjacent cutting edges; and means for gradually moving the blank and the cutter head toward each other laterally as they rotate together until the required depth of cut is obtained.

3. A gear cutting machine comprising a rotating support for a gear wheel blank; a juxtapositioned cutter head with a plurality of circumferentially-arranged longitudinal slides having lengthwise-extending serrated ridges of gear tooth cross sectional configuration, the total number of slides being commensurate with that of the notches to be cut in the blank and respectively having multiple spaced transversely-extending cutting edges; means for continuously rotating the blank and the cutter head in opposite directions and at the proper relative speeds while in constant peripheral contact; means for reciprocating each cutter during rotation of the head for movement across the face of the blank a distance equal substantially to the spacing between adjacent cutting edges; and means for gradually moving the blank and the cutter head toward each other laterally until the required depth of cut is obtained.

4. A gear cutting machine comprising a rotating support for a gear wheel blank; a juxtapositioned cutter head with a circumferentially-arranged series of longitudinal slides having lengthwise-extending serrated ridge projections of gear tooth configuration, the total number of slides being commensurate with that of the notches to be cut in the blank; means for continuously rotating the blank and the cutter head in opposite directions and at the proper relative speeds while in constant peripheral contact; a journal for the cutter head; means for reciprocating the cutter slides as the cutter head rotates so that said slides are moved crosswise of the face of the blank during the periods of individual contact therewith respectively a distance equal substantially to the spacing between adjacent ridges; and means for gradually moving the blank and the cutter head toward each other laterally until the desired depth of cut is obtained.

5. The invention according to claim 4, in which the means for reciprocating the cutter slides includes a stationary annular cam concentric with the axis of the cutter head; individual rollers on the cutter slides to cooperate with the cam; and individual springs influential upon the slides to keep the rollers in contact with said cam.

6. The invention according to claim 4, in which the means for reciprocating the cutter slides determines movement of each of the cutters across the blank face in one direction only during the period of its contact with the blank face.

7. A gear cutting machine according to claim 4, in which the means for reciprocating the cutter slides determines movement of each of the cutter ridges across the blank face in one direction during the period of its contact with said blank face; and further comprising means for gradually moving the blank axially in a direction contrary to cutting movement of the cutter slides.

8. A gear cutting machine comprising a rotating support for a gear wheel blank; a juxtapositioned cutter head with circumferentially-arranged longitudinal slides having lengthwise cutter projections of gear tooth cross sectional configuration respectively with multiple speed transverse cutting ridges, said slides collectively aggregating a number commensurate with that of the notches to be cut in the blank; means for continuously rotating the cutter head and the blank at the proper relative speeds and in opposite directions while in constant peripheral contact; means for supporting the cutter head with capacity for being set either parallel to the blank axis for the cutting of plain spur gears, or in angular positions to opposite sides of the blank axis to enable cutting of right or left-hand helical gears; means for reciprocating the slides to move the cutter projections across the face of the blank a distance equal substantially to the spacing between adjacent cutting ridges; and means for gradually moving the blank and the cutter head toward each other laterally as the two rotate together until the required depth of cut is obtained.

9. A gear cutting machine comprising a rotating support for a gear wheel blank; a juxtapositioned cutter head with circumferentially-arranged sliding cutter elements of gear tooth cross sectional configuration respectively with multiple spaced transversely-extending cutting ridges, said slides collectively aggregating a number commensurate with that of the notches to be cut in the blank; means for continuously rotating the blank and the cutter head in opposite directions and at the proper relative speeds while in constant peripheral contact; means for causing movement of the cutter slides across the blank face during the periods of individual contact therewith a distance equal substantially to the spacing between adjacent cutting ridges; means for supporting the cutter head with capacity for being set in angular positions to either side of the blank axis to enable cutting of right or left-hand helical gears; means for causing the blank to gradually move toward the cutter head until the desired depth of cut is obtained across one corner edge of the blank; and means for thereafter shifting the blank laterally until the notches are cut to the full depth diagonally across the width of the blank face to the opposite corner edge of the latter.

10. A gear cutting machine comprising a rotating support for a gear wheel blank; a juxtapositioned cutter head with a circumferentially-arranged series of longitudinal slides having lengthwise-extending projections of gear tooth configuration respectively with multiple spaced transverse cutting ridges, the total number of slides being commensurate with that of the notches to be cut in the blank; means for continuously rotating the blank and the cutter head in opposite directions and at the proper relative speeds while in constant peripheral contact; means for supporting the cutter head with capacity to be set in angular positions to either side of the blank axis to enable cutting of right or left-hand helical gears, an annular cam concentric with the axis of the cutter head for endwise reciprocating the slides to move the cutter slides across the face of the blank a distance equal substantially to the spacing between adjacent cutting ridges, said cam being rotatively adjustable for adaptation of the machine to the cutting of the right and left-hand helical gears; and means for gradually shifting the blank toward the cutter head during the cutting until the required depth of cut is obtained.

JOHN F. WATERFIELD.